United States Patent [19]
Chan

[11] Patent Number: 6,048,042
[45] Date of Patent: Apr. 11, 2000

[54] COMPACT DISC HOLDER

[75] Inventor: Sik-Leung Chan, Tsuen Wan, The Hong Kong Special Administrative Region of the People's Republic of China

[73] Assignee: C.C. & L Company Limited, The Hong Kong Special Administrative Region of the People's Republic of China

[21] Appl. No.: 09/318,662

[22] Filed: May 25, 1999

[51] Int. Cl.[7] .................................................. A47B 81/06
[52] U.S. Cl. ........................................... 312/9.11; 312/9.14
[58] Field of Search ..................................... 312/9.9, 9.11, 312/9.14, 9.16, 9.17, 9.19, 9.23, 9.24, 9.25, 9.26, 9.34, 9.36, 9.37, 9.38, 9.58, 9.12, 319.1, 319.2, 327, 328, 324; 211/40; 206/308.1

[56] References Cited

U.S. PATENT DOCUMENTS

| | | | |
|---|---|---|---|
| 2,402,076 | 6/1946 | Painter | 312/9.19 |
| 4,664,454 | 5/1987 | Schatteman et al. | 206/308.1 X |
| 5,176,250 | 1/1993 | Cheng | 206/308.1 X |
| 5,338,108 | 8/1994 | Hunt et al. | 312/9.14 X |

*Primary Examiner*—Janet M. Wilkens
*Attorney, Agent, or Firm*—Samuels, Gauthier & Stevens

[57] ABSTRACT

A compact disc holder (100) having a housing (10) formed by a base (20) and a lid (30) and defining a chamber (60) for storing a row of compact discs (62). The lid (30) is hinged to the base (20) for movement between a closed position and an open position. The holder (100) incorporates a disc retrieval mechanism (70) slidable between opposite ends of the chamber (60) for selecting and lifting a compact disc (62) of the row from the chamber (60). The mechanism (70) has an inoperative condition for sliding to select a compact disc (62) from the row and an operative condition for lifting a selected compact disc (62), and comprises a spring (78) resiliently biasing the mechanism (70) towards the operative condition. The lid (30) is arranged in the closed position to hold the mechanism (70) in the inoperative condition against the action of the spring (78).

12 Claims, 6 Drawing Sheets

COMPACT DISC HOLDER

The present invention relates to a holder for storing compact discs, which incorporates a disc retrieval mechanism convenient to use.

SUMMARY OF THE INVENTION

According to the invention, there is provided a compact disc holder comprising a housing formed by a base and a lid and defining a chamber for storing a row of compact discs, said lid being hinged to the base for movement between a closed position and an open position, and a disc retrieval mechanism slidable between opposite ends of the chamber for selecting and lifting a compact disc of the row from the chamber, said mechanism having an inoperative condition for sliding to select a compact disc from the row and an operative condition for lifting a selected compact disc and comprising a spring resiliently biassing the mechanism towards the operative condition, with the lid arranged in the closed position to hold the mechanism in the inoperative condition against the action of the spring.

Preferably, the lid has an inner part defining an upper periphery of the chamber such that when the lid is closed, its inner part will press the selected compact disc down and thus indirectly hold the mechanism in the inoperative condition against the action of the spring.

More preferably, the lid has a substantially part cylindrical inner surface defining the inner part.

Advantageously, the housing includes a spring for resiliently biassing the lid towards the open position and a releasable locker for locking the lid in the closed position.

More advantageously, the locker is in the form of a spring-loaded press bar extending across a front side of the housing.

More advantageously, a damper is used between the lid and the base for slowing down the movement of the lid from the closed position to the open position.

In a preferred embodiment, the mechanism includes a rear member extending to near a bottom side of the chamber for lifting a selected compact disc in the operative condition and a front member for manually moving the rear member to the inoperative condition against the action of the spring.

More preferably, the front and rear members are in the form of respective levers which are simultaneously pivotable upwards to the operative condition and downwards to the inoperative condition.

In a specific preferred construction, the base is provided with a series of teeth corresponding to the positions of the compact discs in the chamber, and the mechanism includes a resilient member for co-operation with the series of teeth to align the mechanism with one of the positions that corresponds to a selected compact disc.

More specifically, the resilient member of the mechanism is resiliently biassed by the spring.

Further more specifically, the mechanism includes a rear member extending to near a bottom side of the chamber for lifting a selected compact disc in the operative condition and a front member for manually moving the rear member to the inoperative condition against the action of the spring, said front member being also the resilient member of the mechanism.

It is preferred that the base includes a locator extending across the chamber, said locator providing a series of slots for locating respective compact discs.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
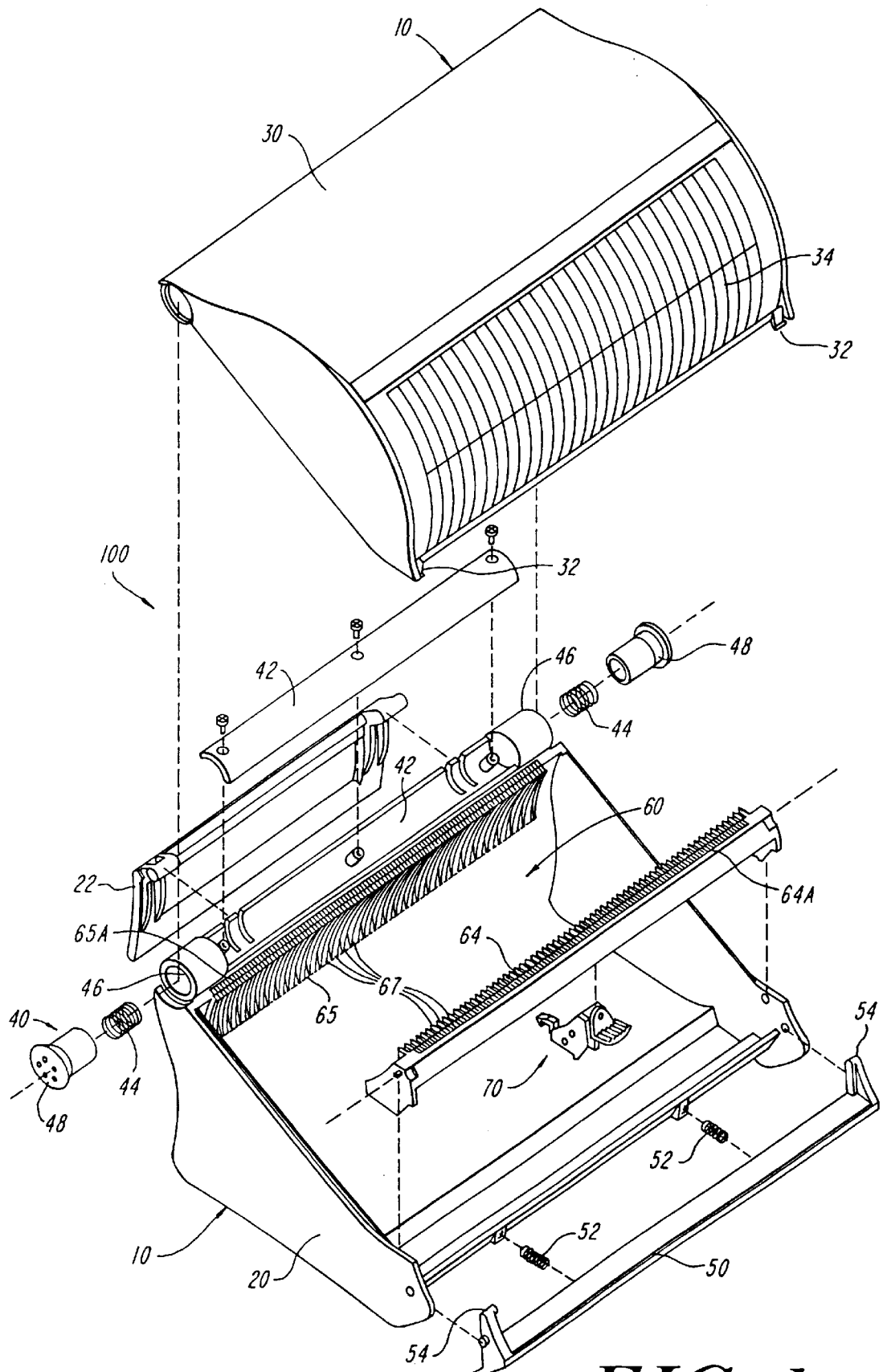
FIG. 1 is an exploded perspective view of an embodiment of a compact disc holder in accordance with the invention, said holder incorporating a disc retrieval mechanism.

Referring initially to FIGS. 1 to 3D of the drawings, there is shown a compact disc or CD holder 100 embodying the invention, which CD holder 100 has a plastics housing 10 formed by a base 20 and a lid 30 pivotably connected to the base 20 by means of a hinge 40. The hinge 40 has a tubular body 42 extending integrally and horizontally along the rear side of the base 20, and includes a pair of torsional coil springs 44 at opposite ends for resiliently biassing the lid 30 upwards from a closed position to an open position. The body 42 provides a pair of opposite end cavities 46 containing the respective springs 44, which are closed by respective plugs 48 in tight engagement with the lid 30. The cavities 46 are filled with a viscous damper liquid in action between the plugs 48 and the respective cavities 46 to slow down the upward movement of the lid 30 from the base 20.

Figure 3A:
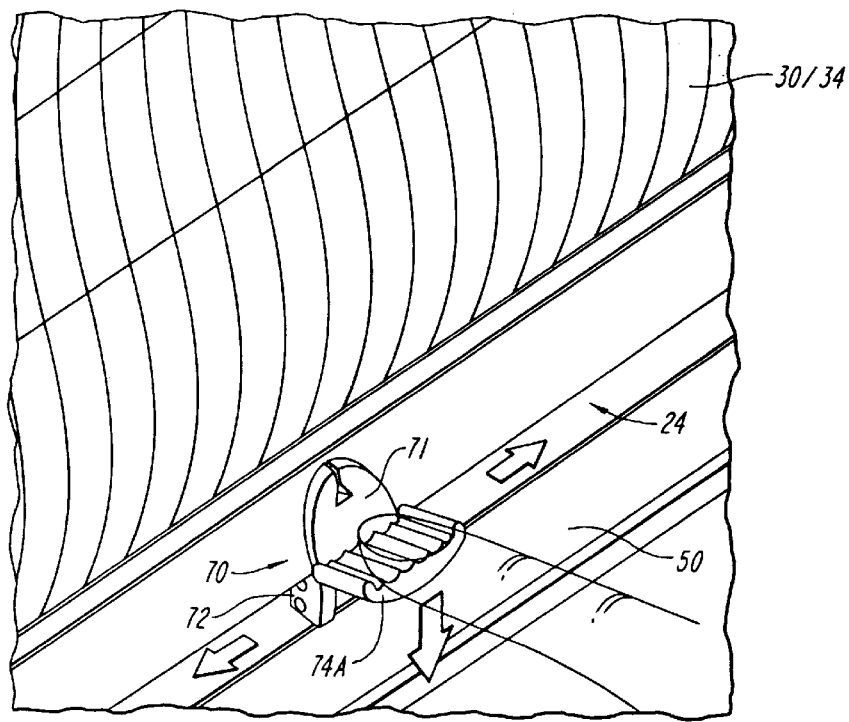
FIGS. 3A to 3D are perspective views illustrating the use of the compact disc holder of FIG. 1.
Figure 3B:
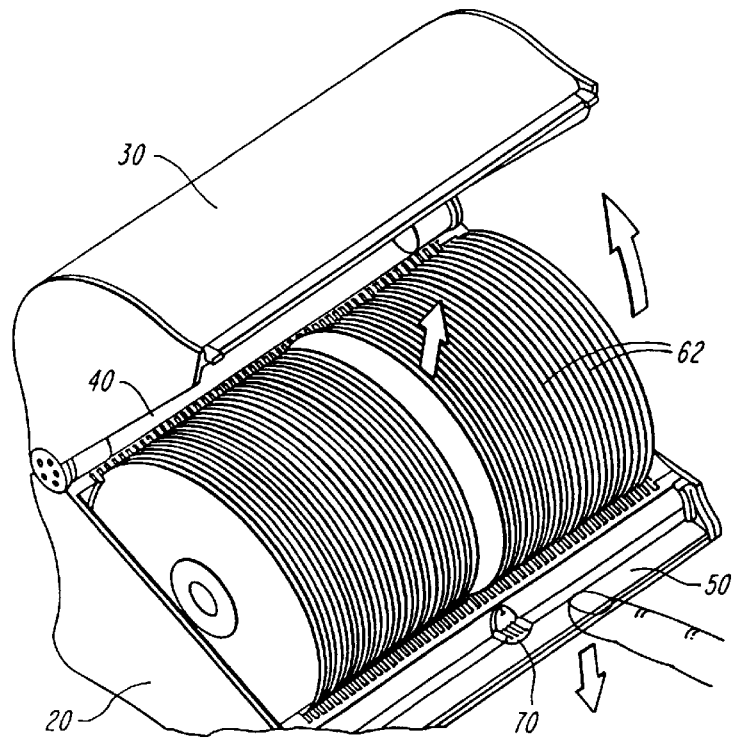

The base 20 includes a side-hinged bar 50 extending horizontally along the front side for locking and releasing the lid 30. The lid 30 has, on its front side, a pair of left and right corner hooks 32. The bar 50 is resiliently biassed to pivot upwards by means of two internal coil springs 52 and includes a pair of opposite end hooks 54 for locking the lid 30 down in the closed position by engaging with the respective lid hooks 32. Upon depression, the bar 50 will pivot downwards to release its hooks 54 from the lid hooks 32, thereby in turn releasing the lid 30 to pivot upwards into its open position (FIG. 3B).

A pair of stops 56 are provided on the base 20 immediately below opposite ends of the bar 50, for turning laterally outwards to block the bar 50 against depression (FIGS. 2A and 2B), thereby locking the lid 30 closed. The base 20 includes a folding handle 22 on its rear side to allow the CD holder 100 to be conveniently carried around, while the lid 30 is locked closed.

A horizontal slot 24 is formed on the front side of the base 20 at a position immediately above and co-extensive with the bar 50. The slot 24 has upper and lower sides which are formed internally with respective series of sixty-odd triangular teeth 26 and 28.

Figure 3C:
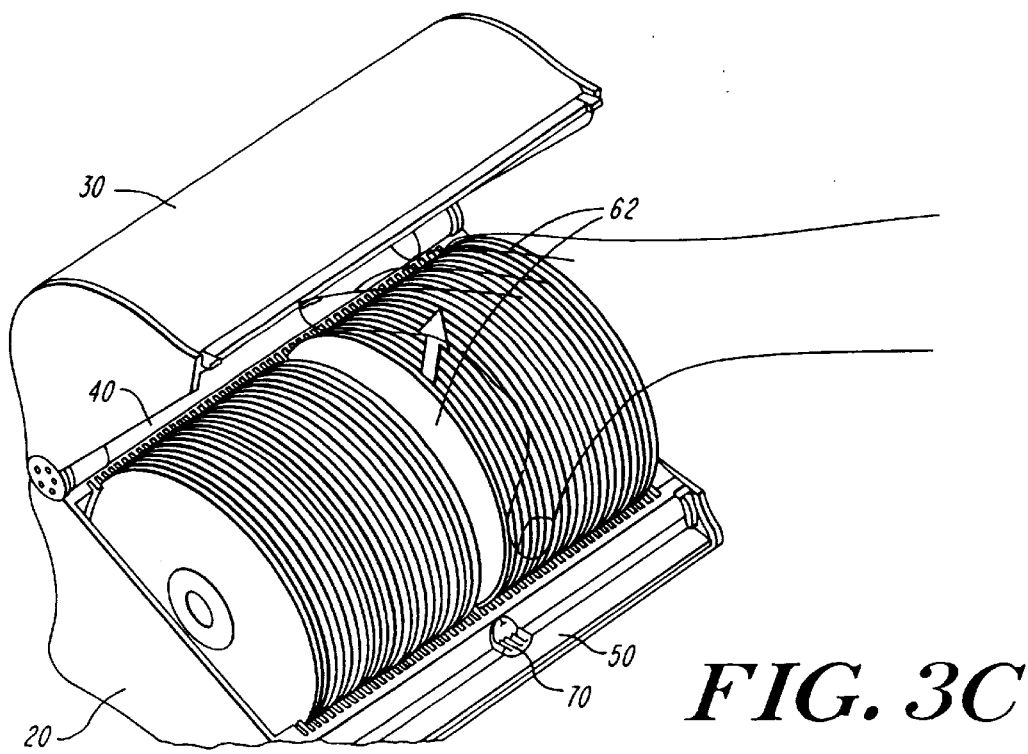
Figure 3D:
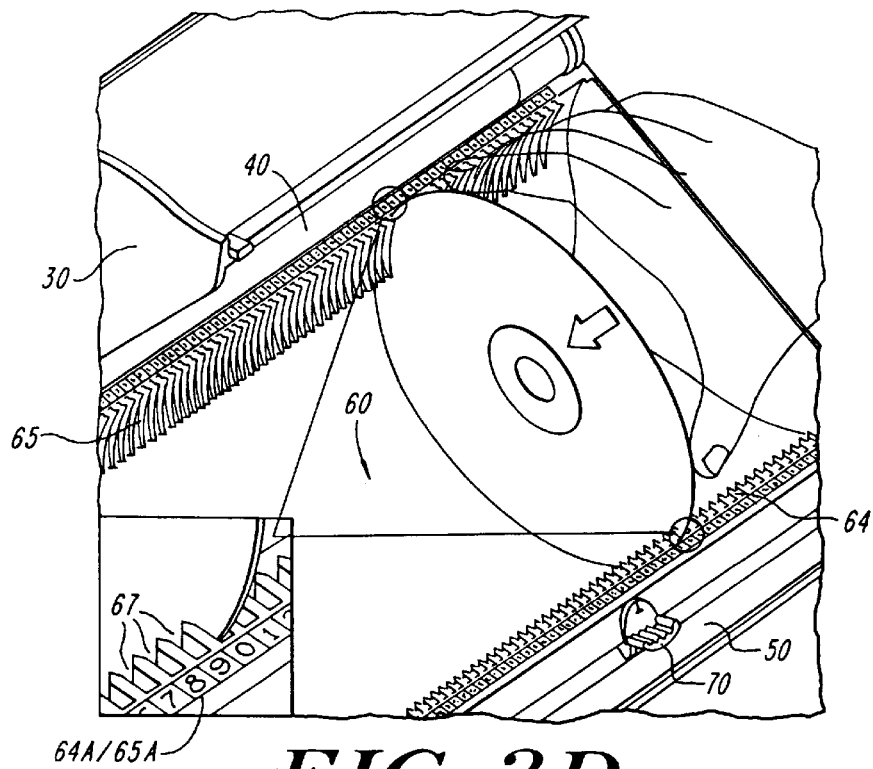

The base 20 and the lid 30, when it is closed, together define a chamber 60 for storing a row of sixty CDs 62. For this purpose, the base 20 is provided with two serrated locators 64 and 65 extending horizontally across the front and rear sides of the CD chamber 60 respectively. Each locator 64/65 provides a series of sixty evenly spaced small gaps or slots 67 which have a width slightly larger than the thickness of the CDs 62 and are aligned with the slots 67 of the other locator 65/64. Each pair of aligned slots 67, one from each locator 64/65, defines a lateral position for locating a respective CD 62 in the chamber 60 (FIG. 3D).

An index tape 64A/65A is stuck alongside each of the locators 64 and 65, which is printed with the same sequence of numerals to mark the respective CD positions. A title sheet 34 is provided on the front side of the lid 30 for marking of CD titles corresponding to the CD positions.

The lid 30 has a shape providing a substantially part cylindrical inner surface (part) to define an upper periphery of the CD chamber 60 for keeping, when closed, the CDs 62 in position within the chamber 60.

The base 20 incorporates a disc retrieval mechanism 70, which is slidable in opposite direction along the slot 24 (FIG. 3A) for selecting and presenting a CD 62 for retrieval. The mechanism 70 has a body 72 and includes a press lever 74 and a lifting lever 76, both being pivotably supported by the body 72. The body 72 has a front pointer 71 for indicating the position of the mechanism 70 along the slot 24 by reference to the locator tape 64A (when the lid 30 is open) or the title list 34 (when the lid 30 is closed).

Figure 2A:
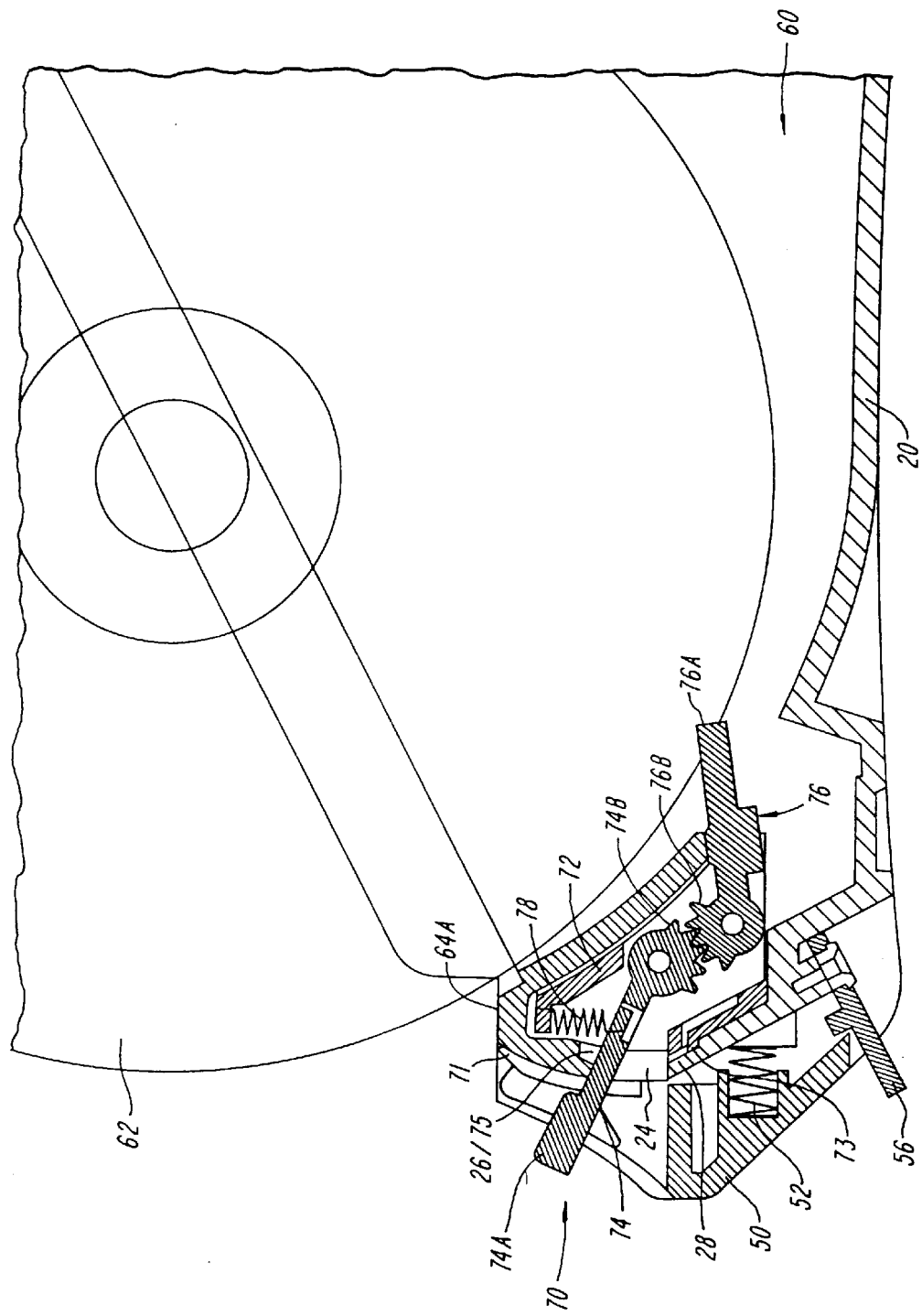
FIGS. 2A and 2B are cross-sectional side views showing alternative operating conditions of the disc retrieval mechanism of FIG. 1.
Figure 2B:
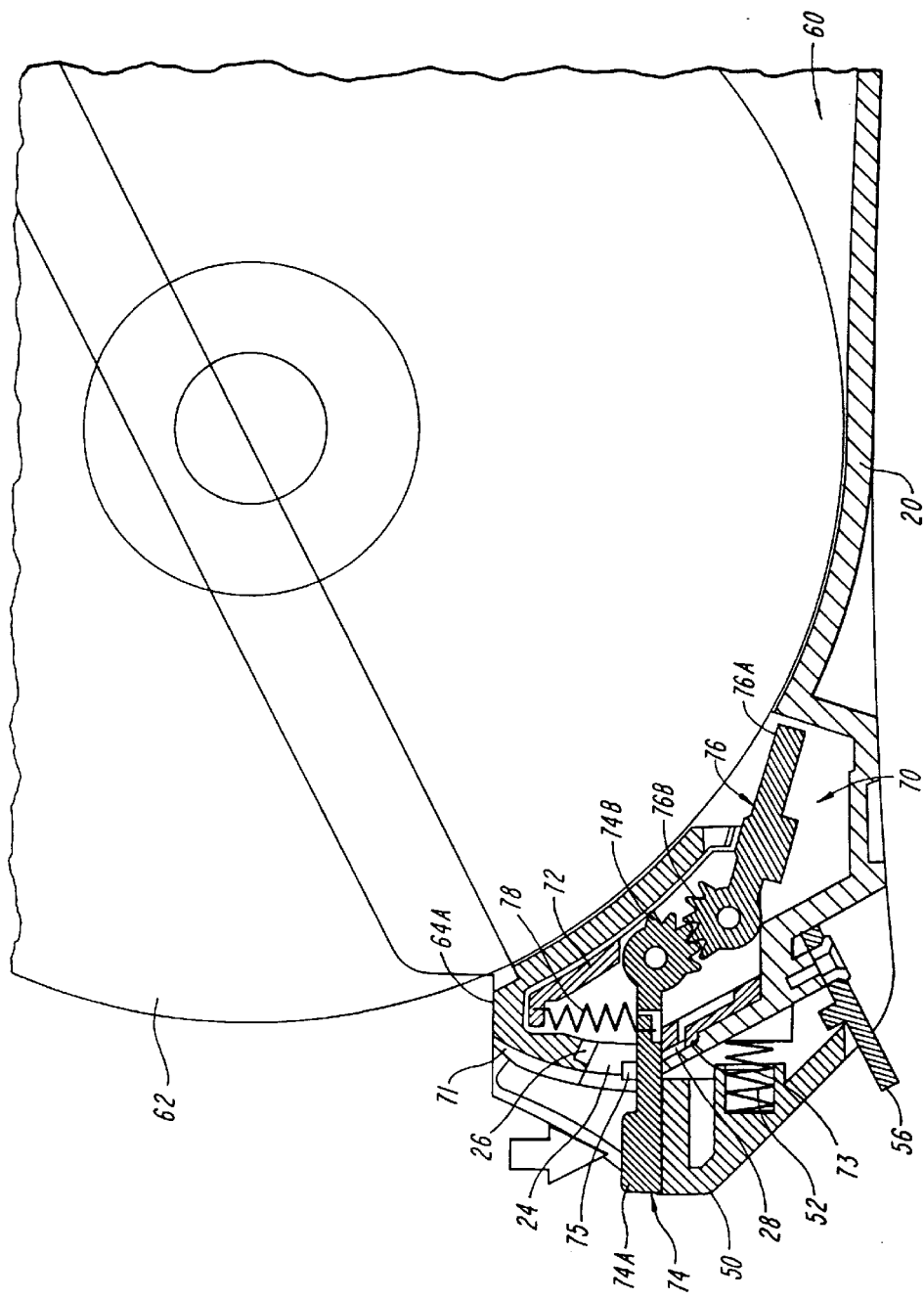

The two levers 74 and 76 have respective adjacent toothed ends 74B and 76B within the body 72, which are in gear engagement with each other to enable simultaneous pivotal movement of the levers 74 and 76 between an operative condition (FIG. 2A) and an inoperative condition (FIG. 2B). In the operative condition, both levers 74 and 76 are pivoted upwards. In the inoperative condition, they are pivoted relatively downwards. A coil spring 78 is used internally to resiliently bias the press lever 74 and hence also the lifting lever 76 upwards into the operative condition.

The press lever 74 has a flat free end 74A extending forwards out through the slot 24, by means of which the levers 74 and 76 may be pressed downwards to the inoperative condition. The press lever 74 includes, on its upper side and behind the flat end 74A, a series of three triangular teeth 75 for engagement with the upper series of teeth 26 of the slot 24, under the action of the spring 78 and when the press lever 74 is released. Such an engagement serves to hold the mechanism 70 in alignment with one of the CD positions, to which the mechanism 70 is slid.

The mechanism 70 is slidable, which is only possible when the press lever 74 is being pressed down to stay in the inoperative condition (FIG. 3A), to one of the CD positions for selecting the CD 62 at that position. The body 72 has a resilient projection 73 for clicking along the lower series of teeth 28 of the slot 24, while the mechanism 70 is sliding, to facilitate the alignment of the mechanism 70 with the CD positions.

The lifting lever 76 has a V-shaped free end 76A extending out from the rear side of the body 72 to reach near the bottom side of the CD chamber 60. Upon release of the press lever 74 when the mechanism 70 is slid to a specific CD position, the V-shaped end 76A serves to engage from below and lift (under the action of the spring 78) the selected CD 62 slightly upwards from the row (FIG. 3C).

While in the closed position, the lid 30 holds the selected CD 62 down and in turn the levers 74 and 76 in the inoperative condition, against the action of the spring 78. As soon as the lid 30 is released to open by pressing the bar 50, the selected CD 62 will automatically be lifted and exposed for retrieval and use (FIG. 3B).

Figure 4:
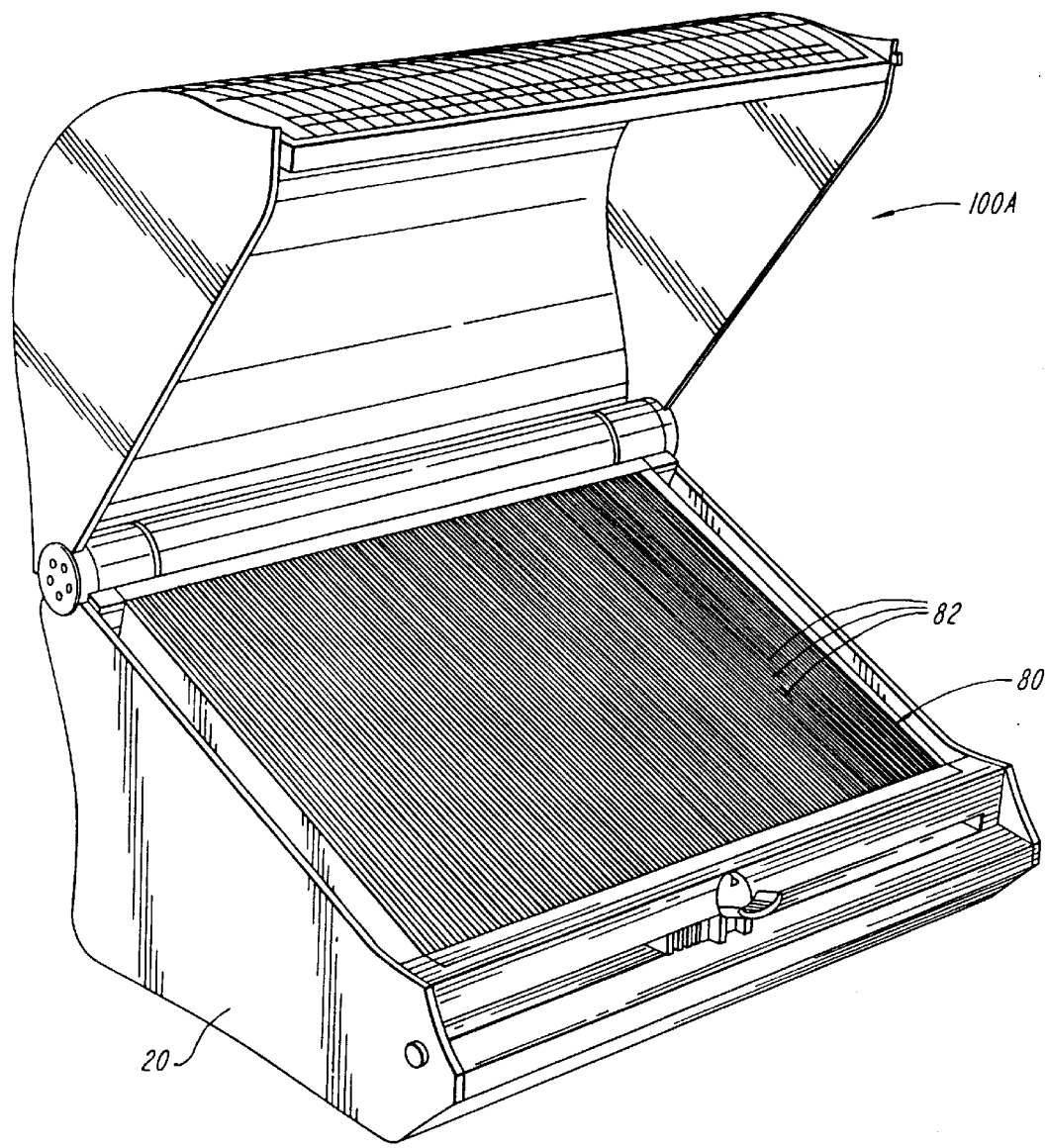
FIG. 4 is a perspective view of a compact disc holder slightly modified from the holder of FIG. 1.

FIG. 4 shows a slightly modified CD holder 100A which is almost identical with the CD holder 100 described above, except with the additional use of a grille 80 extending across the open upper side of the base 20. The grille 80 provides a series of regular slots 82 in alignment with the slots 67 of the locators 64 and 65, for facilitating the insertion of CDs 62 into the CD positions. In this CD holder 100A, only the front index tape 64A is needed.

The term "compact disc" is intended to cover all types of compact discs including, for example, audio CD, video CD, computer CD, and digital video/versatile disc.

The invention has been given by way of example only, and various other modifications of and/or alterations to the described embodiment may be made by persons skilled in the art without departing from the scope of the invention as specified in the appended claims.

What is claimed is:

1. A compact disc holder comprising a housing formed by a base and a lid and defining a chamber for storing a row of compact discs, said lid being hinged to the base for movement between a closed position and an open position, and a disc retrieval mechanism slidable between opposite ends of the chamber for selecting and lifting a compact disc of the row from the chamber, said mechanism having an inoperative condition for sliding to select a compact disc from the row and an operative condition for lifting a selected compact disc and comprising a spring resiliently biasing the mechanism towards the operative condition, with the lid arranged in the closed position to hold the mechanism in the inoperative condition against the action of the spring.

2. A compact disc holder as claimed in claim 1, wherein the lid has an inner part defining an upper periphery of the chamber such that when the lid is closed, its inner part will press the selected compact disc down and thus indirectly hold the mechanism in the inoperative condition against the action of the spring.

3. A compact disc holder as claimed in claim 2, wherein the lid has a substantially part cylindrical inner surface defining the inner part.

4. A compact disc holder as claimed in claim 1, wherein the housing includes a spring for resiliently biassing the lid towards the open position and a releasable locker for locking the lid in the closed position.

5. A compact disc holder as claimed in claim 4, wherein the locker is in the form of a spring-loaded press bar extending across a front side of the housing.

6. A compact disc holder as claimed in claim 4, wherein a damper is used between the lid and the base for slowing down the movement of the lid from the closed position to the open position.

7. A compact disc holder as claimed in claim 1, wherein the mechanism includes a rear member extending to near a bottom side of the chamber for lifting a selected compact disc in the operative condition and a front member for manually moving the rear member to the inoperative condition against the action of the spring.

8. A compact disc holder as claimed in claim 7, wherein the front and rear members are in the form of respective levers which are simultaneously pivotable upwards to the operative condition and downwards to the inoperative condition.

9. A compact disc holder as claimed in claim 1, wherein the base is provided with a series of teeth corresponding to the positions of the compact discs in the chamber and, the mechanism includes a resilient member for co-operation with the series of teeth to align the mechanism with one of the positions that corresponds to a selected compact disc.

10. A compact disc holder as claimed in claim 9, wherein the resilient member of the mechanism is resiliently biassed by the spring.

11. A compact disc holder as claimed in claim 10, wherein the mechanism includes a rear member extending to near a bottom side of the chamber for lifting a selected compact disc in the operative condition and a front member for manually moving the rear member to the inoperative condition against the action of the spring, said front member being also the resilient member of the mechanism.

12. A compact disc holder as claimed in claim 1, wherein the base includes a locator extending across the chamber, said locator providing a series of slots for locating respective compact discs.

* * * * *